US008135835B2

(12) United States Patent
Wilbrink et al.

(10) Patent No.: US 8,135,835 B2
(45) Date of Patent: Mar. 13, 2012

(54) HARDWARE AND PROCESSING REQUEST BROKERAGE

(75) Inventors: Tijs I. Wilbrink, Leiden (NL); Edward E. Kelley, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1005 days.

(21) Appl. No.: 10/908,450

(22) Filed: May 12, 2005

(65) Prior Publication Data

US 2006/0258375 A1 Nov. 16, 2006

(51) Int. Cl.
*G06F 15/173* (2006.01)
(52) U.S. Cl. ........................................ 709/226; 709/238
(58) Field of Classification Search .................. 709/226
See application file for complete search history.

(56) References Cited

U.S. PATENT DOCUMENTS

| | | | |
|---|---|---|---|
| 5,459,837 A | | 10/1995 | Caccavale |
| 6,360,262 B1 | | 3/2002 | Guenthner et al. |
| 2002/0087694 A1 | | 7/2002 | Daoud et al. |
| 2002/0178260 A1 | * | 11/2002 | Chang .......................... 709/225 |
| 2003/0009591 A1 | | 1/2003 | Hayball et al. |
| 2003/0078974 A1 | | 4/2003 | Grayson et al. |
| 2003/0177181 A1 | * | 9/2003 | Chalon ......................... 709/203 |
| 2004/0034591 A1 | | 2/2004 | Waelbroeck et al. |
| 2004/0107144 A1 | | 6/2004 | Short |
| 2005/0076054 A1 | * | 4/2005 | Moon et al. ............... 707/103 Y |
| 2005/0251549 A1 | * | 11/2005 | Hlasny ......................... 709/203 |
| 2006/0026588 A1 | * | 2/2006 | Illowsky et al. .............. 717/171 |
| 2006/0095582 A1 | * | 5/2006 | Nitya et al. ................... 709/236 |
| 2006/0200524 A1 | * | 9/2006 | Costenaro et al. ............ 709/206 |

FOREIGN PATENT DOCUMENTS

WO   WO 03/024012 A2   3/2003

OTHER PUBLICATIONS

Golden G. Richard III. Service Advertisement and Discovery: Enabling Universal Device Cooperation. Sep./Oct. 2000. IEEE Internet Computing.*
James Kardach. Bluetooth Architecture Overview. Q2 2000. Intel Technology Journal.*
Sun Microsystems, Inc. Jini Architecture Specification. Dec. 2001. Sun Microsystems, Inc.*

(Continued)

*Primary Examiner* — Ajay Bhatia
*Assistant Examiner* — Bryan Lee
(74) *Attorney, Agent, or Firm* — DeLio & Peterson, LLC; Kelly M. Nowak; Ronald A. Kaschak (57) ABSTRACT

Methods, brokerage systems and program products for enabling a mobile electronic device communicate with another electronic device for accomplishing a requested task without interrupting a user of the other electronic device. A task is requested at the mobile device and a transmission signal locates other electronic devices within a receivable range of the transmission signal. A number of scenarios of various combinations of located other devices is built, whereby each scenario is capable of accomplishing the requested task. One of these scenarios is selected, information relating to the task is sent to the electronic devices within such scenario, and then the requested task is performed by such selected electronic devices. Upon completion of the task, deliverables may be transmitted from the selected electronic device to a predetermined destination. Owners of the selected electronic devices may be rewarded for usage of their devices.

17 Claims, 2 Drawing Sheets

OTHER PUBLICATIONS

Sumi Helal, Nitin Desai, Varum Verma and Choonhwa Lee. "Konark—A Service Discovery and Delivery Protocol for Ad-hoc Networks," Proceedings of the Third IEEE Conference on Wireless Communication Networks (WCNC), New Orleans, Mar. 2003.*

Balan et al. Tactics-Based Remote Execution for Mobile Computing. 2003. Proceeding MobiSys '03 Proceedings of the 1st international conference on Mobile systems.*

Satyanarayanan. Pervasive Computing: Vision and Challenges. IEEE Personal Communications, 2001.*

Gu et al. Adaptive Offloading for Pervasive Computing. Aug 9, 2004 IEEE.*

Kalasapur et al. Seamless Service Composition (SeSCo) in Pervasive Environments. MSC'05, Nov. 11, 2005, Singapore.*

Kalapriya et al. A Framework for Resource Discovery in Pervasive Computing for Mobile Aware Task Execution. CF'04, Apr. 14-16, 2004, Ischia, Italy.*

Goyal. A Lightweight Secure Cyber Foraging Infrastructure for Resource-Constrained Devices. IEEE 2004.*

* cited by examiner

HARDWARE AND PROCESSING REQUEST BROKERAGE

FIELD OF THE INVENTION

The present invention is directed generally to electronic devices, and in particular, to methods, brokerage systems and program products for processing and performing requested tasks and exchanging information between electronic devices, particularly mobile devices, within a detectable electronic transmission range of each other.

DESCRIPTION OF RELATED ART

The use of mobile devices, such as, cell phones, personal digital assistants ("PDA"s), pagers, personal computers, laptops and the like has become increasingly popular over the years. This is particularly true for those individuals who travel often or those who run numerous errands. Yet, performance differences between the various available mobile devices vary greatly.

As with many of the currently available mobile devices, specific devices are developed to perform predetermined tasks within the processing capabilities of each of these devices. However, a user of a mobile device may desire to accomplish a task that is outside the scope of the particular mobile device he/she is using, or even accomplish a task that may require more processing power than the mobile device is capable of handling. For example, a cell phone has much less processing power in comparison to a laptop computer, and as such, is typically not capable of easily and timely uploading a web page to the Internet as compared to the laptop computer.

With stationary electronic devices, such as a group of computers linked together by a network, a requested task may be split amongst the group of computers via the network for easily, efficiently and quickly accomplishing the requested task. Unfortunately, no systems currently exist for allowing mobile devices communicate with one another for accomplishing a requested task in a timely, efficient and reliably manner, or even for a particular type of device carry out a specific task that the requesting device is not capable of performing.

Accordingly, a need exists in the art for methods, brokerage systems and program products that easily, efficiently and timely accomplish a requested task from a mobile device to another electronic device that is capable of handling and completing the requested task.

SUMMARY OF THE INVENTION

Bearing in mind the problems and deficiencies of the prior art, it is therefore an object of the present invention to provide methods, brokerage systems and program products that allow a first electronic device, preferably a mobile device, remotely communicate with a second electronic device that is within a detectable electronic transmission range to the first electronic device for accomplishing a requested task(s).

It is another object of the present invention to provide methods, brokerage systems and program products that allow a mobile device to remotely communicate with another electronic device that is within a detectable electronic transmission range thereof for easily and efficiently accomplishing a requested task that is outside the capabilities of the requesting mobile device.

It is yet another object of the present invention to provide methods, brokerage systems and program products that allow a mobile device use physical capabilities of another electronic device within a detectable electronic transmission range via a remote communication.

A further object of the invention is to provide methods, brokerage systems and program products that allow a mobile device to remotely communicate with another electronic device for accomplishing a requested task within any time constraints.

Still another object of the present invention is provide methods, brokerage systems and program products that allow a mobile device to silently communicate with another electronic device that is within a detectable electronic transmission range thereof without interrupting the user of such electronic device.

Still other objects and advantages of the invention will in part be obvious and will in part be apparent from the specification.

The above and other objects, which will be apparent to those skilled in art, are achieved in the present invention, which is directed to in a first aspect a method for performing a requested task between electronic devices. The method includes providing a mobile electronic device and requesting a task at the mobile electronic device. A signal corresponding to the task is transmitted from the mobile electronic device, and then the method locates an electronic device within a receivable transmission range of the signal. This located electronic device is capable of accomplishing the requested task. Information relating to the task is then transmitted from the mobile electronic device to the electronic device, and the task is then accomplished at the electronic device.

In accordance with the invention, the electronic device is located if it is determined that the mobile electronic device is not capable of accomplishing the requested task. The step of locating the electronic device may involve determining all available wireless connection interfaces on the mobile electronic device, followed by searching for these available wireless connection interfaces on other electronic devices within the receivable transmission range of the mobile electronic device. At least one electronic device having the determined available wireless connection interfaces capable of accomplishing the task is identified and an identification of such electronic device is received at the mobile electronic device.

Preferably, the method locates a plurality of electronic devices within the receivable transmission range of the mobile electronic device. The plurality of electronic devices may include mobile devices, stationary devices, wireless devices, non-wireless devices, or even combinations thereof. In this aspect, the amount of resources required to process and accomplish the task are determined, as well as determining compatible electronic devices from the plurality of electronic devices that are compatible with the mobile electronic device. Using both the determined amount of resources and compatible electronic devices data, a plurality of electronic device scenarios are built that are each potentially capable of accomplishing the requested task.

The compatible electronic devices may be determined by analyzing resource capabilities and capacities of each of the plurality of electronic devices, and then identifying those compatible electronic devices having at least one wireless connection interface compatible with a wireless interface of the mobile electronic device. A list of compatible electronic devices is stored on the mobile device, and using this information, the plurality of electronic device scenarios is built. The plurality of built electronic device scenarios include at least one compatible electronic device capable of accomplishing the task, or even a plurality of compatible electronic devices that together are capable of accomplishing the task.

These built scenarios are capable of accomplishing the task within any imposed time constraints. Optionally, the built scenarios may be updated based on an availability status of each compatible device within the various scenarios.

Once the electronic device scenarios are built, one of these built scenarios are selected and then a set of instructions for the task are transmitted from the mobile device to each compatible electronic devices within the selected scenario for completion of the requested task. Deliverables may also be transmitted from the compatible electronic devices completing the task to a preselected destination. Owners of the compatible electronic devices completing the task may be rewarded for use of their respective devices. An essential feature of the invention is that the requested task may be completed without interrupting end users of the compatible electronic devices (i.e., the owner of such devices or anyone utilizing such devices). Optionally, the compatible electronic devices performing the requested task may have default commands installed thereon, or warning systems, for informing end users thereof that a task requested in accordance with the invention is being performed thereon such compatible electronic device, such that the end user will not interrupt performance or completion of such requested task or turn off the compatible electronic device performing such task. This enables completion of the requested task by increasing the success of completion of such task.

In another aspect, the invention is directed to a brokerage system for performing a requested task between a mobile electronic device and another electronic device. The brokerage system includes a request system for requesting a task at a mobile electronic device, and a first transmission system for transmitting a signal corresponding to the task from the mobile electronic device. A location system of the brokerage system locates at least one electronic device within a receivable transmission range of the signal that is capable of accomplishing the task, and a second transmission system of the brokerage system transmits information relating to the requested task from the mobile electronic device to the other located electronic device. A performance system of the brokerage system then accomplishes the requested task at the located at least one electronic device.

In still another aspect, the invention is directed to a computer program product including a computer usable medium having computer readable program code means embodied therein for performing a requested task between electronic devices. The computer program product includes computer readable program code means for both providing a mobile electronic device and requesting a task at the mobile electronic device. A computer readable program code means transmits a signal corresponding to the task from the mobile electronic device, and another computer readable program code means locates an electronic device within a receivable transmission range of the signal that is capable of accomplishing the requested task. The program product also includes a computer readable program code means for transmitting information relating to the task from the mobile electronic device to the electronic device, and a computer readable program code means for accomplishing the task at the electronic device.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED
EMBODIMENT(S)

In describing the preferred embodiment of the present invention, reference will be made herein to FIGS. 1-2 of the drawings in which like numerals refer to like features of the invention.

The present invention provides methods, brokerage systems and program products that allow a mobile electronic device to communicate with another electronic device that is within a detectable or receivable electronic transmission range thereof for easily, efficiently and timely accomplishing a requested task from the mobile device. This requested task, which is requested by a user of the mobile device, may be outside of the processing capabilities of the requesting mobile device, or it may be too cumbersome (e.g., in processing capacities, requirements, time, etc.) for the requesting mobile device to process and accomplish. The invention advantageously provides a solution for processing these types of service requests and/or specific tasks requested from a mobile device by locating other electronic devices within a receivable electronic transmission range of the mobile device, whereby these other electronic devices are equipped, capable and have agreed to accomplish the requested task. These other electronic devices may be within the environment surrounding the requesting mobile device, or more particularly, within close physical proximity to the requesting mobile device.

For ease of understanding the invention, a user of a mobile device may desire to accomplish a specific task on his mobile device, however, the user's mobile device may be incapable of accomplishing the requested task, or the user may be confronted with time constraints in which he has to accomplish the requested task. In accordance with the invention, a request is remotely broadcast or transmitted from the requesting mobile device to within the environment surrounding the requesting mobile device. This broadcast transmission request is received via a wireless connection by other electronic devices of the invention that are within the receivable range of the broadcast transmission request (i.e., in peer-to-peer fashion). The invention determines which of the located electronic devices are capable of handling the requested task, with respect to the particular processing requirements of the requested task, as well as within any time constraints. It then determines which owners of the located electronic devices have agreed to allow their respective devices be used by others for completing various requested tasks. The results are then displayed at the requesting user's mobile device, whereby the requesting user selects at least one of these located electronic devices to accomplish the requested task (i.e., the requested task is accomplished by the peer-to-peer network of the invention).

An agreement may also be entered into whereby the requesting user is allowed to use the selected electronic device to accomplish his desired task, and the owner of the selected electronic device receives some type of benefit or reward. Alternatively, the owners of the selected devices may not receive a benefit. For instance, the requesting user may pay for any expenses incurred as a result of completion of the requested task, whereby the owner of the selected electronic device may never know his device was used by another in accordance with the invention. In either event, upon entering the agreement, the requested task is performed and completed, and then any deliverables are sent back to the requesting user at the requesting mobile device. An essential feature of the invention is that the foregoing methods, brokerage systems, and program products execute and complete the invention without interrupting or interfering with any tasks the owners of the other electronic device(s) may be carrying out on their respective device(s), and preferably, without such owners' knowledge.

Advantageously, the invention enables a mobile device and another electronic device, which may also be a mobile device, to process and complete requested tasks directly between each other (i.e., as an ad-hoc, peer-to-peer network) when the requesting mobile device is not able to accomplish the task itself, without the need for a network. For example, the invention may be used to make a request from a cell phone that requires the running of a particular program that the cell phone is incapable of running. A transmission of the requested task is transmitted within the environment surrounding the cell phone (along with an identification of the particular program) whereby a laptop computer within a detectable transmission range, that is both capable of running the particular program and is accepting requests, receives the broadcast transmission and completes the requested task. As another example, usage of a specific feature, such as faxing capabilities, may be requested in accordance with the invention. For instance, a user of the invention may transmit a service request from his cell phone to send a fax using another's fax facility that is within a receivable transmission range of the user's cell phone.

Figure 1:
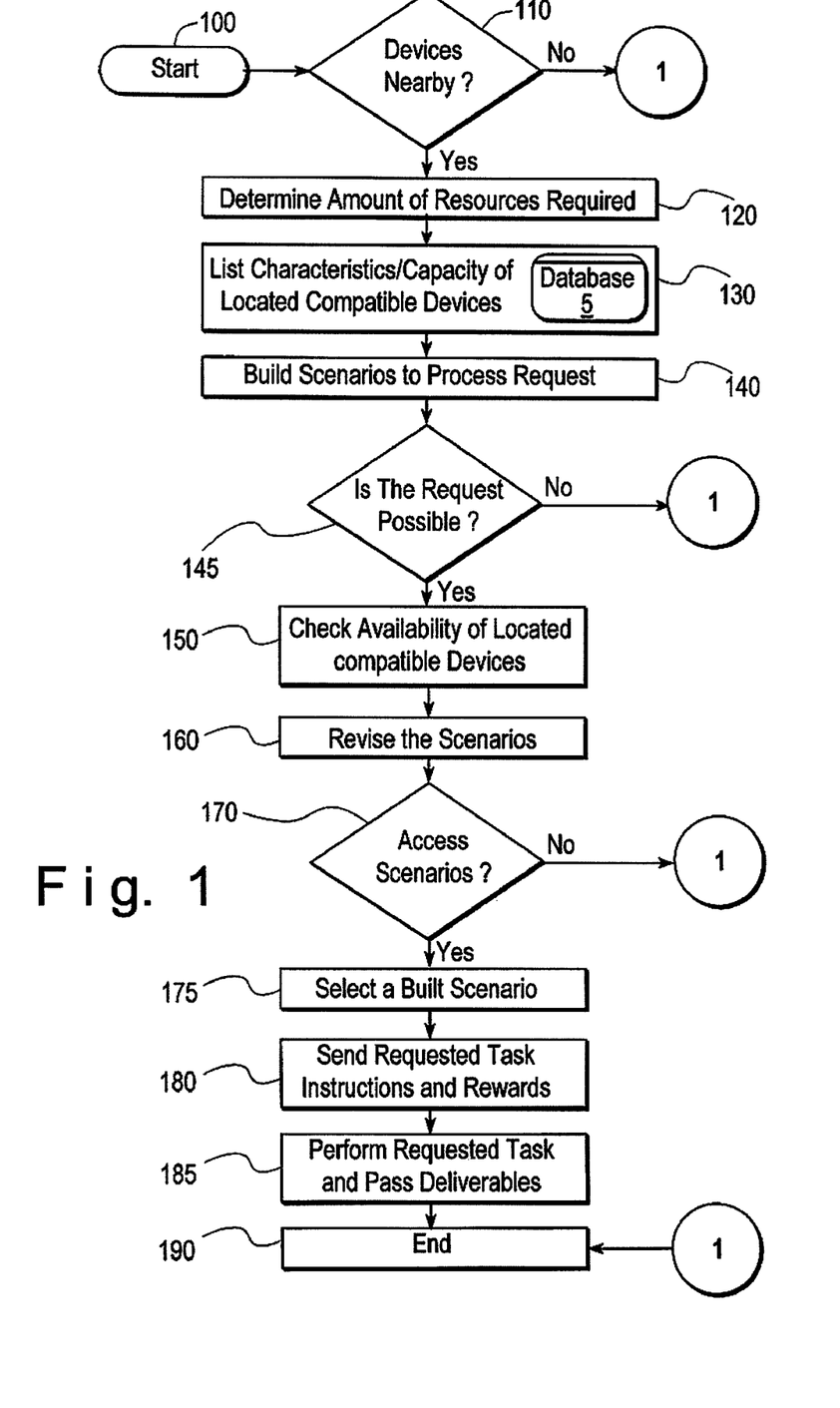
FIG. 1 is a flow diagram illustrating the method steps of a first embodiment of the invention for remotely using available resources on electronic devices, preferably mobile devices, in close proximity to each other.
Figure 2:
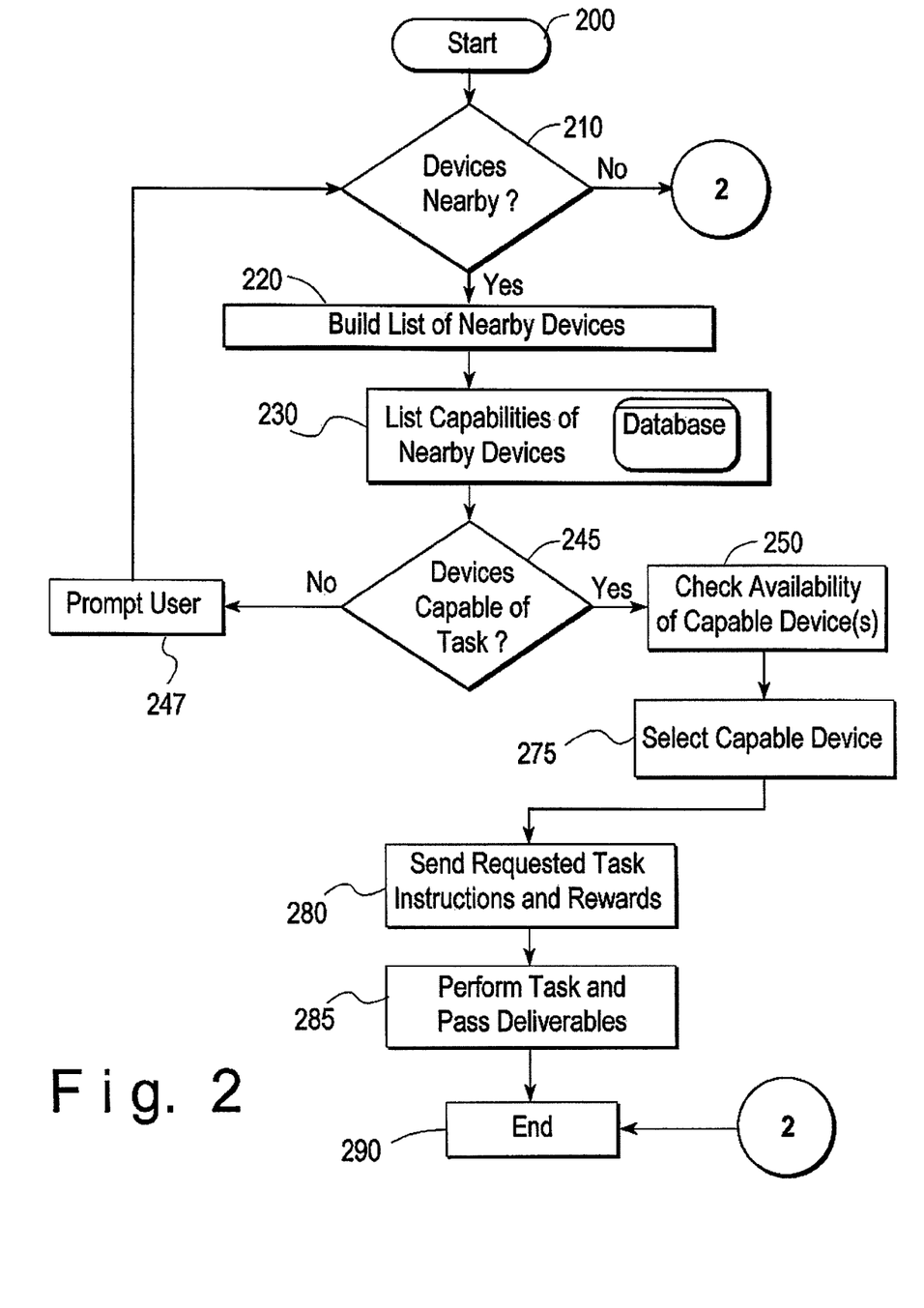
FIG. 2 is a flow diagram illustrating the method steps of another embodiment of the invention for remotely using hardware and/or application features of electronic devices, preferably mobile devices, in close proximity to each other.

Flow charts of the process of the present invention are shown in FIGS. 1 and 2. Numerals in circles indicate connections to and from other parts of the flow chart.

For ease of understanding the invention, FIGS. 1 and 2 are described in relation to methods, brokerage systems and program products for processing requested transactions between two or more electronic devices, whereby at least the requesting device is mobile in nature. However, it should be appreciated and understood that the present invention may be used in conjunction with a variety of different electronic devices including, but not limited to, mobile devices, stationary devices, wireless devices, non-wireless devices, and even combinations thereof.

FIG. 1 illustrates the flow process of a first embodiment of the present invention for usage of computing resources and brokerage systems for processing requested transactions from a mobile device to another electronic device(s), and the flow chart description is as follows:

100 Start. The present system is capable of being installed, executed and run on systems and/or machines (hereinafter referred to as "device(s)") including both mobile devices such as cell phones, pagers, PDAs, laptop computers, cameras, sound players and/or recorders (e.g., music players, voice recorders, etc.), or any other type of mobile electronic device for personal use, as well as on stationary devices including, but not limited to, telephones, facsimile machines, computers, portals, and the like. Once installed, the system is executed and runs on the device. A user of a first device having the present invention installed therein initiates the invention by making a command from his personal device to at least one other distinct device running the invention. This command is for processing a request from the first device to the other device(s). In accordance with the invention, the request itself varies widely depending upon the type of device the user is utilizing, and may include tasks such as performing calculations, making a phone call, accessing the internet, uploading/downloading text and/or images, printing, faxing, and the like.

For instance, the invention may be initiated by a user selecting a command feature on the user's device, or simply by the user "turning on" his personal device. The invention automatically scans the user's request and determines whether or not this request is capable of being accomplished on the user's device. If the request is capable of being carried out on the user's device in a timely and efficient manner, then the process flow ends. If, however, it is determined that the user's request is not capable of being carried out on the user's personal device, or that such task would take too long or employ too many resources on the use's personal device, then the request is transferred to another device running the present invention for processing, handling and ultimately accomplishing the desired request. Go to step 110.

110 Devices Nearby? Once a request has been made and it is determined that the requested task cannot be efficiently or easily carried out on the user's personal device, the invention then determines whether or not other compatible devices exist within a detectable (i.e., receivable) transmission range of the user's device for communication therewith. When the invention is running on mobile devices, this task is preferably accomplished using wireless communications. These wireless connections may include any known wireless connection used in the art including, but not limited to, a remote connection, LAN, Bluetooth, infrared, radio frequencies, Wireless Area Networks (WAN) and the like.

In accordance with the invention, these other compatible devices are detected by determining all of the wireless connection interfaces available on the user's personal device, and then searching for these interfaces on other devices within the receivable transmission range of the user's device that are also running the invention (i.e., an ad-hoc network is built as the devices wirelessly connect). The located other devices have compatible running interfaces as the request initiating user's device, and are thus potentially capable of accomplishing the requested task. The request-initiating user is then informed of all located compatible devices and the types of such devices that are within the receivable transmission range of the user's personal device. This may be accomplished by viewing a listing of all the types of located compatible devices on the user's personal device.

For instance, if the user's device is a laptop computer that has a LAN wireless connection interface, and/or a Bluetooth wireless connection interface, the present invention searches for and detects other devices of the invention located within the receivable transmission range of the user's laptop that also have installed and running thereon a LAN and/or Bluetooth wireless connection. If the invention locates other compatible devices within the receivable transmission range of the user's device, then the process flow continues to step 120. However, if compatible devices cannot be located within the receivable transmission range of the user's device, then the process flow continues to step 190 and the system is exited.

120 Determine Amount of Resources Required. The particular task requested by the user and the amount of resources required to process such user's request are then determined on the user's personal device. In so doing, the user's request is analyzed to determine whether it is a specific task requested by the user (e.g. a facsimile transmission), or a set of tasks indicated indirectly by the user. For instance, wherein a user has created a web page and is making a request to upload the web page to the Internet, an indirect set of tasks may include the steps of uploading the web page to an Internet provider, and the Internet provider being provided with a set of instructions as to how to handle such upload request. Once the task and amount of resources are determined, the process flow continues to step 130.

130 List Characteristics and/or Capacity of Each Located Compatible Device. Once the amount of required resources to run the user's requested task have been determined in step 120, the invention then examines resource capabilities and capacities (e.g., processing power, remaining capacity, speed, remaining battery power, availability of printing capabilities, fax capabilities, GPS capabilities, and the like) of each located compatible device from step 110, and stores this information in a database of device features 5 on the user's personal device. Using this collection of compatible device features in database 5, a list of compatible devices is built and stored on the requesting user's personal device. The compatible device list includes the device identification, type of device, as well as the resource capabilities and capacities associated with each of these compatible devices. Once the list is built, the process flow continues to step 140.

140 Build Scenarios to Process Request. Once the resource capabilities and capacities of each located compatible device have been determined, a plurality of scenarios are then built and stored in a scenario table or list format on the user's personal device. These scenarios are built using the available information from the compatible device list built in step 130. In so doing, each built scenario may include a number of different located compatible devices, whereby each possible scenario is potentially capable of performing and completing the user's requested task. Each built scenario capable of accomplishing the requested task includes the identifications and types of each located compatible device, the resource capabilities and capacities associated with each such compatible device, as well as an estimated amount of time for completing the requested task. The estimated amount of time within the built scenarios is beneficial when a time constraint has been imposed upon completion of the requested task.

In accordance with the invention, a number of these scenario plans are built and stored on the requesting user's personal device in the event that one or more of such scenarios is ultimately not capable of performing or cannot complete the user's requested task. For instance, an owner of one of the devices within a selected built scenario may not agree to usage of his personal mobile device by others, such that this particular built scenario will not accomplish the user's requested task and fails.

A plurality of built scenarios provides the user with greater success that the user's requested task will be accomplished. For instance, wherein four compatible devices (A, B, C and D) have been located, devices A and B may be able to run a requested task by itself, while C and D cannot. The owner of device A has disabled the present system on his compatible device since he does not want to be an active participant within the system of the present invention, and as such, the requested task cannot be carried out on device A. The owner of device B has the present system running on his compatible device, and is allowing for other users of the invention on their own respective devices to access and potentially use his compatible device for performing and completing their desired requested tasks. Devices C and D cannot perform the requested task alone, however, the combination of C and D allows for the processing request to be fulfilled, thereby providing the user with at least two possible scenarios for successfully completing his requested task. Once the scenarios are built, the process flow continues to step 145.

145 Is the Request Possible? Using the built scenarios, it is then determined whether or not the user's requested task can actually be performed and completed using the built scenarios within any time constraints that may be imposed upon completion of such task. The invention searches the varying combinations of built scenarios and determines whether or not the user's requested task can be accomplished by analyzing the varying combinations of information therein. If it is determined that the user's requested task is capable of being performed using the various built scenarios available to the user, and within any time constraints, then the process flow continues to step 150. If the user's requested task is not capable of being completed, then the process flow continues to step 190 where the process flow ends and the system is exited.

150 Check Availability of Located Compatible Devices. If it has been determined that the user's requested task is possible on certain built scenarios, the availability for each of the compatible devices within these scenarios is then checked. This may be accomplished by sending a message, such as through a local or wireless connection, to these compatible devices. The message at least includes the user's requested task, an estimate of the resources required for running and completing such requested task, as well as any other limitations and/or special requests including, but are not limited to, time limits, confidentiality matters, encryption settings, user settings and/or passwords, and the like.

Also embedded and sent within the message is an agreement for execution between the requesting user and each end user at the selected compatible devices, as well as any benefit/reward offerings (i.e., reward offers) made to the end users of the compatible devices. Each agreement is executed if the end user at each located compatible device agrees to allow the requesting user's task to be carried out on such end user's device.

Reward offerings are offered by the requesting user to the end users at their compatible devices in exchange for allowing the requesting user to perform and complete his requested task on such end users' devices. These offerings have a certain value to users of the invention, and may be sent in a list format for allowing users at compatible devices to selected desired rewards. The reward offers may be preselected by the end users such that the agreement is entered instantaneously and silently, without the end user being aware and having to be interrupted from any present activity, or they may be selected at the time of entering the agreement whereby the end user is aware that the requesting user is asking to use the end user's device for a particular task. For instance, reward offers may include, but are not limited to, an item of value, tokens, credits, credit points, rewards, reward points, money, compensation, frequent flyer miles, future uses of the invention, or any other item of value to the end users of the invention, or even combinations thereof.

Once the availability of compatible devices within the various built scenarios has been determined, that is, once the end users of certain located compatible devices within the various built scenarios agree that the requesting user's task may be performed on such end user's device, the process flow continues to step 160. It should be appreciated in accordance with the invention that the requesting user's task may be performed on a number of end user devices simultaneously in order to accomplish and complete the requested task.

160 Revise the Scenarios. Based on the results of the availability check step 150 of the invention, the built scenarios are revised such that the list of built scenarios now only includes those executable built scenarios in which all end users of located compatible devices agree to have the requesting user's task be performed on their respective devices. This revised list of executable built scenarios is stored and viewed at the requesting user's personal device. The process flow continues to step 170.

170 Assess Scenarios? Once the revised list of executable scenarios has been built, the invention then optionally verifies that the updated built scenarios, within the revised list of executable built scenarios, have sufficient resources for accomplishing the requesting user's task, both as to power capacities, processing characteristics and within any imposed time constraints. If none of the built scenarios within the executable built scenarios are sufficient for accomplishing the requested task, then the process flow goes to step 190 and the process flow ends. However, if built scenarios capable of accomplishing the requested task in fact exist, then the process flow continues to step 175. Alternatively, since the foregoing step is optional, the process flow may progress from step 160 directly to step 175.

175 Select a Built Scenario. The requesting user must then select one of the built scenarios that are capable of accomplishing the requested task from the revised list of executable built scenarios. The selection of the particular built scenario depends upon the requesting user's preferences such as, but not limited to, lowest in cost, fastest, easiest to execute, most reliable, those scenarios that have a secure connection (especially, for the transmittal of sensitive or confidential materials and information), based upon preselected rewards to be distributed from the user to the other end users, and the like. The user's preferences may be preset, altered based upon the particular task to be carried out, standard preferences, preferences for a specific task, etc. The process flow continues to step 180.

180 Send Requested Task Instructions and Rewards. A set of instructions relating to the particular task to be performed is then transmitted from the requesting user's device to the end user(s) device(s) within the chosen built scenario. These instructions include details as to how the requested task is to be accomplished including, but not limited to, an identification of the particular task, where, when and how the task is to be accomplished, as well as an identification of the material that is to be delivered back to the requesting user. For instance, if the requested task is to translate a web page into a PDA XML page, then the set of instructions sent to the compatible devices may include the URL that is to be accessed, the size (resolution) of the web page that the requesting user would like to have returned to him, and the particular response or information from such web page that the requesting user would like to have sent back to him upon completion of the translation.

Since a response or information may be returned to the requesting user, then also included within the set of instructions may be an identification of the requesting user's device or a particular destination that the user would like such response to be sent to. For instance, the set of instructions may include a cell phone number, an e-mail address, a URL address, a PDA identification number, mailing address, phone or fax number, and the like. The rewards to be granted to the end users of the compatible devices may also be sent along with the set of instructions at this point of the invention, thereby fully executing the agreement between the requesting user and the end users at this point. Alternatively, the rewards may be sent to the end user in a subsequent step, such as, upon notification of completion of the requested task to the requesting user.

The process flow continues to step 185.

185 Perform Requested Task and Pass Deliverables. The end user(s) compatible device(s) then accomplish the requested task by processing the request (including determining how and when the results are to be sent to the requesting user), performing and completing the requested task using the peer-to-peer network of the invention. In accomplishing the task, the end user(s) compatible device(s) then transmits or sends the results to the requesting user's device or to the requesting user at a preselected destination based upon the identification of the requesting user's device or the particular destination that the user would like such response to be sent which was transmitted to the end user devices in step 180. Optionally, the end user compatible devices may be provided with a default command that alerts such users that their respective devices are being used by another in accordance with the invention. In this manner, in the event the end users at the compatible devices attempt to turn-off their devices, or disengage such devices from the invention, the end users will be alerted not to turn off or disengage their devices, thereby increasing the success of completion of the task being currently performed thereon. The process flow continues to step 190.

190 End. Upon completion of the requesting user's task, the process flow ends and the system of the invention is exited.

EXAMPLE

A user may request to upload an image from the user's cellular phone to a particular web page. At this point in the invention, the user has initiated the invention (step 100) by making a request from his cell phone. The user's request is processed, and once it is determined that the user's cell phone can not accomplish the requested task, the invention locates nearby devices (step 110) that are compatible with the wireless connection interfaces on the user's cell phone and that are capable of accomplishing the user's requested task of uploading an image from a cell phone to a web page. From the requesting user's perspective, the foregoing and following steps of the invention are all performed in a timely, efficient manner. These located compatible devices may include a cell phone, a first laptop computer and a second laptop computer.

The amount of resources required to accomplish the user's task are then determined (step 120), and the resource capabilities and capacities of each located compatible device from step 110 are examined and stored in a database. A list of compatible devices is also built and stored on the user's cell phone (step 130).

From the compatible devices (phone, and first and second laptop computers), a number of scenarios capable of processing the user's request within any time constraints are built (step 140). The various built scenarios may include these located compatible devices alone or in varying combinations with each other.

It is then determined whether or not the user's requested task of uploading an image can actually be performed and completed using the various built scenarios (step 145). If, in this example, the located compatible devices were to include only other cell phones, then each built scenario would be composed of cell phones only, and as such, the requesting user's task may not be able to be accomplished, such that, the built scenarios would fail, and the process flow of the invention ends. However, in this example, since the located compatible devices included devices have processing capabilities that may be capable of accomplishing the user's task (i.e., the first and second computers), the process flow continues.

The availability of each located capable devices is then checked by determining whether or not the end users of such devices are allowing other users of the invention to use their respective devices (step 150). In this example, it may be that the owner of the first computer is not allowing other users of the invention to utilize his laptop. As such, any built scenario including the first computer will fail and the process flow of the invention ends.

| Device Identification | Device Type | Processing Power | Remaining Capacity | Connection Available? |
|---|---|---|---|---|
| Nokia 3610 | Cellular Phone | 0.1 MHz | 3 Wh | Yes |
| IBM Thinkpad 1 | Laptop Computer | 1.6 MHz | 42 Wh | No |
| IBM Thinkpad 2 | Laptop Computer | 1.6 MHz | 42 Wh | Yes |

After all the located compatible devices have been checked for availability, the various built scenarios are then revised to form a revised list of executable built scenarios in which all end users of located compatible devices within such scenarios agree to have the requesting user's task be performed on their respective devices (step 160). In this example, the revised list of executable built scenarios include only those scenarios that are composed of the cell phone and/or the second laptop computer, and are as follows:

| Executable Built Scenarios | Device ID | Device Type | Processing Power | Remaining Capacity | Connection Available? | Reward Type |
|---|---|---|---|---|---|---|
| Scenario 1 | Nokia 3610 | Cell Phone | 0.1 MHz | 3 Wh | Yes | Money |
| Scenario 2 | IBM Thinkpad 2 | Laptop Computer | 1.6 MHz | 42 Wh | Yes | Credit Points |
| Scenario 3 | Nokia 3610 and IBM Thinkpad 2 | Cell Phone and Laptop | 0.1 MHz + 1.6 MHz | 3 Wh + 42 Wh | Yes | Money and Credit points |

It is then determined whether or not the above scenarios have sufficient resources for accomplishing the requested task of uploading an image from a cell phone to a web page (step 170). Since at least one of these scenarios in the foregoing example includes a laptop computer, which is capable of uploading an image to a web page, the requesting user then selects the scenario that best fits the user's predetermined preferences (step 175). For instance, the user may select scenario 2 since it includes a laptop computer, it is available, has sufficient resources, the desired reward is credit points (since the user may not want to pay monetary rewards), and it potentially being the most reliable way to upload the image to a web page.

The set of instructions needed for uploading the requesting user's image to a particular web page, along with an identification of the requesting user's device or a particular destination to which the user would like such response to be sent to, are then transmitted to this second laptop computer. Also sent to the second laptop are details as to where, when and how the requested task is to be accomplished, along with the rewards given to the owner of the second computer. The requesting user's image is then uploaded to the desired web page by the second computer, and then the second computer sends any deliverables back to the destination specified by the requesting user (e.g., a notification that the task has been accomplished) (step 185), and the process ends (step 190).

FIG. 2 illustrates the flow process of a second embodiment of the present invention for usage of hardware or application features of nearby computing devices for processing requested transactions between mobile devices, and the flow chart description is as follows:

200 Start. This aspect of the invention is initiated when a user of the invention makes a request from his personal device that a specific task be performed whereby this task is not available on such requesting user's device. For instance, a requesting user may make a request from his cell phone to use a fax machine, specific processing software on a laptop, and the like. The process flow then continues to step 210.

210 Any Devices Nearby? Once a request has been made to use a specific device not available on the requesting user's personal device, the invention then determines whether or not other compatible devices exist within the receivable transmission range of the user's device for communication therewith. This is preferably accomplished through determining and located all compatible wireless connection interfaces on the user's device as described above in step 110, and locating all devices having such compatible interfaces, whereby these located devices may potentially be capable of carrying out the user's requested task. The process flow continues to step 220.

220 Build List of Nearby Devices. All located devices having compatible interfaces with the requesting user's device are then provided within a list or table that identifies the various different types of located devices for further analysis in accordance with the invention. Continue to step 230.

230 List capabilities of located nearby devices. The located compatible devices are then analyzed to determine the capabilities and/or functions each located device is capable of carrying out, and these results are stored in a revised list or table in a database on the requesting user's device, and then the process flow continues to step 245. For example, the list of capabilities of located nearby devices may appear as follows:

| Device ID | Device Type | Fax Enabled? | Bluetooth? | Wireless Connection? | Secure |
|---|---|---|---|---|---|
| Nokia 3610 | Cell Phone | Yes | Yes | No | Yes |
| IBM Thinkpad 2 | Laptop Computer | Yes | Yes | Yes | Yes |

245 Are Devices Capable of Task? Using the revised list of located devices, which identifies the particular capabilities, functions and tasks each located device is capable of performing, it is then determined whether or not these located devices are actually capable of performing and completing the requesting user's requested task.

For instance, if the requesting user has requested that a fax be sent, but his cell phone is not capable of performing such a function, then the requesting user initiates the invention on his cell phone to locate and list all compatible devices within the receivable transmission range of the requesting user's cell phone. These listed compatible devices are then parsed to determine their capabilities, and this information is stored in a database. The database is then analyzed to determine whether or not the located devices are actually capable of performing and completing the requesting user's requested task (i.e., whether or not any of the located devices are capable of sending a fax).

If there are no devices in the revised list that are capable of accomplishing the requested task, then the process flow goes to step 247. However, if the revised list of devices includes compatible devices that are capable of accomplishing the requested task, then the process flow continues to step 250.

247 Prompt User. The requesting user is notified that no compatible devices have been found that can accomplish his requested task, and the process flow reverts back to step 210 where all compatible devices are once again located (this is particularly useful in an environment that has a continual change of users with their respective devices). It should be appreciated that this portion of the process flow may be repeated until compatible devices capable of performing the requested task are located, or alternatively, when the requesting user decides to end the process flow.

250 Check Availability of Capable Devices. Those located devices capable of carrying out the requested task are then checked for availability, such as by sending a message through a local or wireless connection. The message may include the user's requested task, limitations and/or special requests, an agreement, any reward offers, and the like. The available, capable devices are those devices owned by users of the invention that have agreed to allow their devices be used by others in exchange for rewards. The process flow continues to step 275.

275 Select Capable Device. The requesting user must then select one of the capable devices to carry out the requested task. The selected capable device is chosen based on the requesting user's preferences. The process flow continues to step 280.

280 Send Requested Task Instructions and Rewards. A set of instructions relating to the particular task to be performed is sent from the requesting user's device to the end user's capable device for carrying out the requested task. These instructions include details as to how the requested task is to be accomplished including, but not limited to, an identification of the particular task, where, when and how the task is to be accomplished, as well as an identification of the material that is to be delivered back to the requesting user.

Also included within the set of instructions may be an identification of the requesting user's device or a particular destination that the user would like such response to be sent to. The rewards to be granted to the end users of the capable devices may also be sent along with the set of instructions at this point of the invention, thereby fully executing the agreement between the requesting user and the end users at this point. Alternatively, the rewards may be sent to the end user in a subsequent step, such as, upon notification of completion of the requested task to the requesting user.

The process flow continues to step 285.

285 Perform Requested Task and Pass Deliverables. The requested task is accomplished by processing the request at the end user capable device, performing and preferably completing the requested task, and then passing any deliverables to a designated device and/or location. In so doing, the end user capable device may send the results to the requesting user's device or to a pre-selected destination chosen by the requesting user. The process flow continues to step 290.

290 End. Upon completion of the requesting user's task, the process flow ends and the system of the invention is exited.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A method for performing a requested task between electronic devices comprising:
   providing a mobile electronic device having a wireless interface;
   requesting a task at said mobile electronic device;
   transmitting a wireless signal corresponding to said task from said wireless interface of said mobile electronic device;
   locating and connecting to a plurality of electronic devices within a receivable transmission range of said wireless signal using said wireless interface of said mobile electronic device, thereby building an ad-hoc, peer-to-peer network between said mobile electronic device and said plurality of electronic devices;
   determining the amount of resources required to process and accomplish said task;
   analyzing resource capabilities and capacities of each of said plurality of electronic devices at said mobile electronic device;
   identifying from said plurality of electronic devices compatible electronic devices having at least one wireless connection interface compatible with said wireless interface of said mobile electronic device using said analyzed resource capabilities and capacities data;
   storing a list of said compatible electronic devices of said mobile electronic device;
   building and storing a plurality of electronic device scenarios on said mobile electronic device using said determined amount of resources required to process and accomplish said task in combination with said stored list of compatible electronic devices, each of said scenarios having at least one compatible electronic device capable of accomplishing said task;
   selecting one of said plurality of electronic device scenarios on said mobile electronic device;
   transmitting information relating to said task from said wireless interface of said mobile electronic device directly to said at least one compatible electronic device of said selected electronic device scenario; and
   accomplishing said task at said at least one compatible electronic device.

2. The method of claim 1 further including the steps of:
   determining whether said mobile electronic device is capable of accomplishing said task;
   and locating said electronic device if it is determined that said mobile electronic device is not capable of accomplishing said task.

3. The method of claim 1 wherein said step of locating said electronic device comprises:
   determining all available wireless connection interfaces on said mobile electronic device;
   searching for said determined available wireless connection interfaces of other electronic devices within said receivable transmission range of said mobile electronic device;
   identifying said electronic device from said other electronic devices, whereby said electronic device has at least one of said determined available wireless connection interfaces that is capable of accomplishing said task; and receiving an identification of said electronic device at said mobile electronic device.

4. The method of claim 1 wherein said plurality of electronic devices are selected from the group consisting of mobile devices, stationary devices, wireless devices, non-wireless devices, and combinations thereof.

5. The method of claim 1 wherein each of said plurality of built electronic device scenarios comprise a compatible electronic device that is capable of accomplishing said task.

6. The method of claim 1 wherein each of said plurality of built electronic device scenarios comprise a plurality of compatible electronic devices that together are capable of accomplishing said task.

7. The method of claim 1 wherein each of said plurality of built electronic device scenarios are capable of accomplishing said task within an imposed time constraint for completing said task.

8. The method of claim 1 further including the steps of determining the availability of each said compatible electronic device within each of said electronic device scenarios; and updating said plurality of built electronic device scenarios based on said availability results to include only those built electronic device scenarios having compatible electronic devices allowing said task to be accomplished.

9. The method of claim 1 further including the steps of selecting a built electronic device scenario from said plurality of electronic device scenarios;

transmitting a set of instructions for said task from said mobile electronic device to each of said compatible electronic devices within said selected built electronic device scenario; and accomplishing said task by said compatible electronic devices within said selected built electronic device scenario.

10. the method of claim 9 further including transmitting deliverables from said compatible electronic devices within said selected built electronic device scenario to a preselected destination upon completion of said task.

11. the method of claim 9 further including rewarding owners of said compatible electronic devices within said selected built electronic device scenario upon completion of said task.

12. The method of claim 9 wherein said task is completed without interrupting end users of said compatible electronic devices within said selected built electronic device scenario.

13. The method of claim 9 further including providing said compatible electronic devices within said selected built electronic device scenario with a default command for informing end users of said compatible electronic devices within said selected built electronic device scenario that said task is being performed thereon, thereby enabling completion of said task.

14. A brokerage system for performing a requested task between a mobile electronic device and another electronic device comprising:

a mobile phone having a wireless interface;

a request system of said mobile device for requesting a task at said mobile electronic device;

a first transmission system of said mobile device for transmitting a wireless signal from said wireless interface of said mobile electronic device corresponding to said task;

a location system of said mobile device for locating and connecting to at least one electronic device within a receivable transmission range of said wireless signal thereby building an ad-hoc, peer-to-peer network between said mobile electronic device and said plurality of electronic devices, said at least one electronic device being capable of accomplishing said task;

an analysis system of said mobile device for analyzing resource capabilities and capacities of each of said plurality of electronic devices, and for identifying from said plurality of electronic devices compatible electronic devices having at least one wireless connection interface compatible with said wireless interface of said mobile electronic device;

a storage device of said mobile device for storing a list of said compatible electronic devices on said mobile electronic device;

a building system of said mobile device for building and storing a plurality of electronic device scenarios on said mobile electronic device using said stored list of compatible electronic devices, each of said scenarios having at least one compatible electronic device capable of accomplishing said task a selection system of said mobile device for selecting one of said plurality of electronic device scenarios on said mobile electronic device;

a second transmission system of said mobile device for transmitting information relating to said task from said wireless interface of said mobile electronic device directly to said at least one compatible electronic device of said selected electronic device scenario; and a performance system of said at least one compatible electronic device for accomplishing said task at said at least one compatible electronic device.

15. The brokerage system of claim 14 further including:

said second transmission system for transmitting a set of instructions for said task from said wireless interface of said mobile electronic device to each of said electronic devices within said selected built electronic device scenario; and said performance system for accomplishing said task by said compatible electronic devices within said selected built electronic device scenario.

16. The brokerage system of claim 15 further including a third transmission system for transmitting deliverables from said compatible electronic devices within said selected built electronic device scenario to a preselected destination upon completion of said task.

17. A computer program product comprising:

a non-transitory computer usable medium having computer readable program code means embodied therein for performing a requested task between a mobile electronic device having a wireless interface and an electronic device, said computer non-transitory computer usable medium having:

computer readable program code means for requesting a task at said mobile electronic device;

computer readable program code means for transmitting a wireless signal corresponding to said requested task from said wireless interface of said mobile electronic device;

computer readable program code means for locating and connecting to a plurality of electronic devices within a receivable transmission range of said wireless signal using said wireless interface of said mobile electronic device, thereby building an ad-hoc, peer-to-peer network between said mobile electronic device and said plurality of electronic devices;

computer readable program code means for determining the amount of resources required to process and accomplish said task;

computer readable program code means for analyzing resource capabilities and capacities of each of said plurality of electronic devices at said mobile electronic device;

computer readable program code means for identifying from said plurality of electronic devices compatible electronic devices having at least one wireless connection interface compatible with said wireless interface of said mobile electronic device using said analyzed resource capabilities and capacities data;

computer readable program code means for storing a list of said compatible electronic devices on said mobile electronic device;

computer readable program code means for building and storing a plurality of electronic device scenarios on said mobile electronic device using said determined amount of resources required to process and accomplish said task in combination the said stored list of compatible electronic devices, each of said scenarios having at least one compatible electronic device capable of accomplishing said task;

computer readable program code means for selecting one of said plurality of electronic device scenarios on said mobile electronic device;

computer readable program code means for transmitting information relating to said requested task from said wireless interface of said mobile electronic device directly to said at least one compatible electronic device of said selected electronic device scenario; and computer readable program code means for enabling accomplishment of said requested task at said at least one compatible electronic device.

* * * * *